US006993078B2

(12) United States Patent
Hall et al.

(10) Patent No.: US 6,993,078 B2
(45) Date of Patent: Jan. 31, 2006

(54) MACROBLOCK CODING TECHNIQUE WITH BIASING TOWARDS SKIP MACROBLOCK CODING

(75) Inventors: Barbara A. Hall, Endwell, NY (US); Agnes Y. Ngai, Endwell, NY (US); John M. Sutton, Endicott, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 10/112,314

(22) Filed: Mar. 28, 2002

(65) Prior Publication Data

US 2003/0185303 A1 Oct. 2, 2003

(51) Int. Cl.
H04N 7/12 (2006.01)
(52) U.S. Cl. .................................. 375/240.16
(58) Field of Classification Search ............... 348/412, 348/416, 404, 409; 375/240.24, 240.16, 375/240.26, 240.03, 240.12
See application file for complete search history.

(56) References Cited

U.S. PATENT DOCUMENTS

| 5,440,345 A | 8/1995 | Shimoda ................ 348/411 |
| 5,748,789 A | 5/1998 | Lee et al. ................ 382/243 |
| 5,978,029 A * | 11/1999 | Boice et al. ........... 375/240.14 |
| 6,075,918 A * | 6/2000 | Strongin et al. .............. 386/68 |
| 6,192,076 B1 * | 2/2001 | Kondo ................... 375/240.12 |
| 6,192,148 B1 | 2/2001 | Lin ............................. 382/166 |
| 6,430,222 B1 * | 8/2002 | Okada .................... 375/240.03 |
| 2001/0001614 A1 * | 5/2001 | Boice et al. ........... 375/240.24 |
| 2002/0044604 A1 * | 4/2002 | Nieweglowski et al. . 375/240.3 |
| 2003/0202595 A1 * | 10/2003 | Suzuki .................. 375/240.16 |

\* cited by examiner

Primary Examiner—Vu Le
Assistant Examiner—Behrooz Senfi
(74) Attorney, Agent, or Firm—William H. Steinberg, Esq.; Kevin P. Radigan, Esq.; Heslin Rothenberg Farley & Mesiti, P.C.

(57) ABSTRACT

A technique for encoding macroblocks of a frame is provided which includes switching a coding decision for a macroblock from a non-intra decision to a skip macroblock decision when the absolute prediction error for the macroblock is less than a prediction error threshold and the magnitude of the motion vector for the at least one macroblock is less than a motion vector threshold. In one embodiment, the prediction error threshold is multiple programmable prediction error thresholds, which are for comparison with the absolute luminance and chrominance summation components and the maximum luminance and chrominance difference values. The motion vector threshold may be a preset value when the macroblock is to be predictive coded, and may be the magnitude of the motion vector of the previous macroblock when the macroblock is to be bi-directionally encoded.

17 Claims, 7 Drawing Sheets

O LUMINANCE DATA (Lx,y)
X CHROMINANCE DATA (Cb)x,y; (Cr)x,y

*fig. 5A*

O LUMINANCE DATA (Lx,y)
X CHROMINANCE DATA (Cb)x,y; (Cr)x,y

*fig. 5B*

MACROBLOCK CODING TECHNIQUE WITH BIASING TOWARDS SKIP MACROBLOCK CODING

TECHNICAL FIELD

This invention relates in general to compression of digital visual images, and more particularly, to a technique for encoding macroblocks of a frame of a sequence of video frames. The technique includes switching a non-intra macroblock coding decision to a skip coding decision when certain prediction error and motion vector conditions are true.

BACKGROUND OF THE INVENTION

Technological advances in digital transmission networks, digital storage media, very large scale integration devices, and digital processing of video and audio signals have been converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, an assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

The ISO MPEG-2 compression standard specifies only the syntax of the bitstream and semantics of the decoding process. The choice of coding parameters and trade-offs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

In certain low bit rate applications, too many bits may be used while encoding a picture. When this occurs, the picture can become blocky and picture quality suffers. In view of this, and in order to establish commercial advantage, a novel design is desired for biasing an encoding process towards skip macroblock coding when possible without degrading picture quality.

SUMMARY OF THE INVENTION

Briefly summarized, the present invention comprises in one aspect a method for encoding macroblocks of at least one frame of a sequence of video frames. The method includes encoding at least one macroblock of the frame by deciding to code the at least one macroblock as a non-intra macroblock; and switching the coding decision for the at least one macroblock from non-intra to skip coding when an absolute prediction error for the at least one macroblock is less than a prediction error threshold and a magnitude of the motion vector for the at least one macroblock is less than a motion vector threshold.

In an enhanced implementation, the prediction error threshold comprises multiple programmable prediction error thresholds. For example, a first threshold would be a threshold for an absolute luminance summation component of the at least one macroblock, a second threshold would be a threshold for an absolute chrominance summation component of the at least one macroblock, a third threshold would be a threshold for a maximum luminance difference value for the at least one macroblock, and a fourth threshold would be a threshold for a maximum chrominance value for the at least one macroblock. In order for the switching to proceed, the absolute luminance and chrominance summation components and the maximum luminance and chrominance difference values each needs to be less than its corresponding threshold.

Systems and computer program products corresponding to the above-summarized methods are also described and claimed herein.

Advantageously, applicants recognize herein that an encoding process which allows a user flexibility to skip coding of certain macroblocks is beneficial. This skip macroblock biasing technique allows reduction in the total number of bits needed to encode a picture since a skip macroblock requires no bits to encode. By encouraging skip macroblocks based on user defined thresholds for maximum and prediction error sums, a user can fine tune the criteria for skipping macroblocks, and thereby reduce the total number of bits needed to encode a picture. This is particularly advantageous when attempting to encode a digital video stream at a low bit rate. Alternatively, bits that are saved by skipping coding of one or more macroblocks in a picture could be redistributed to other portions of the picture as needed.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 5a & 5b illustrate positioning of luminance and chrominance signals in 4:2:2 frame format and 4:2:0 frame format, respectively.

BEST MODE FOR CARRYING OUT THE INVENTION

Figure 1:
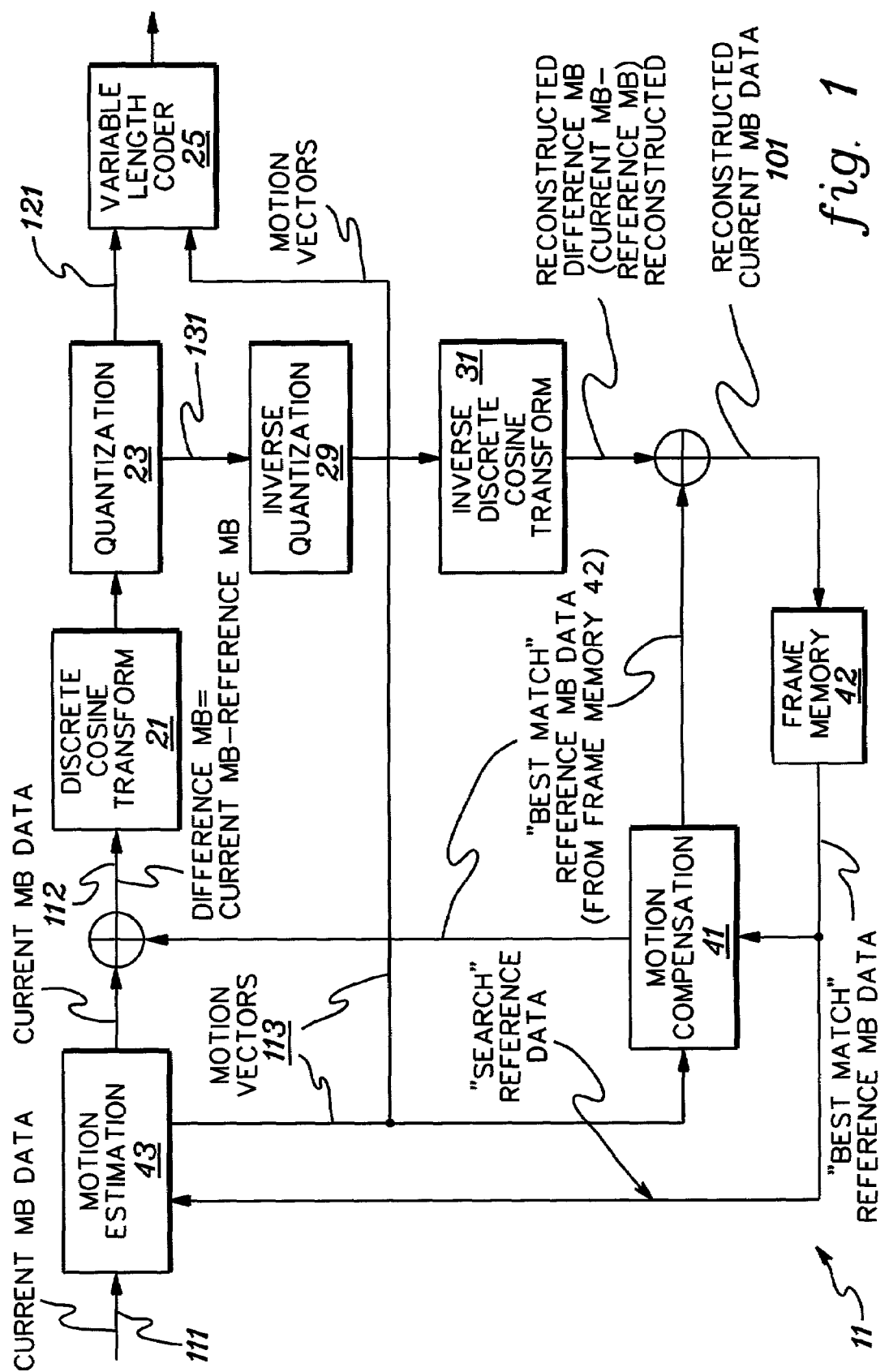
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the ith picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve a desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

One method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
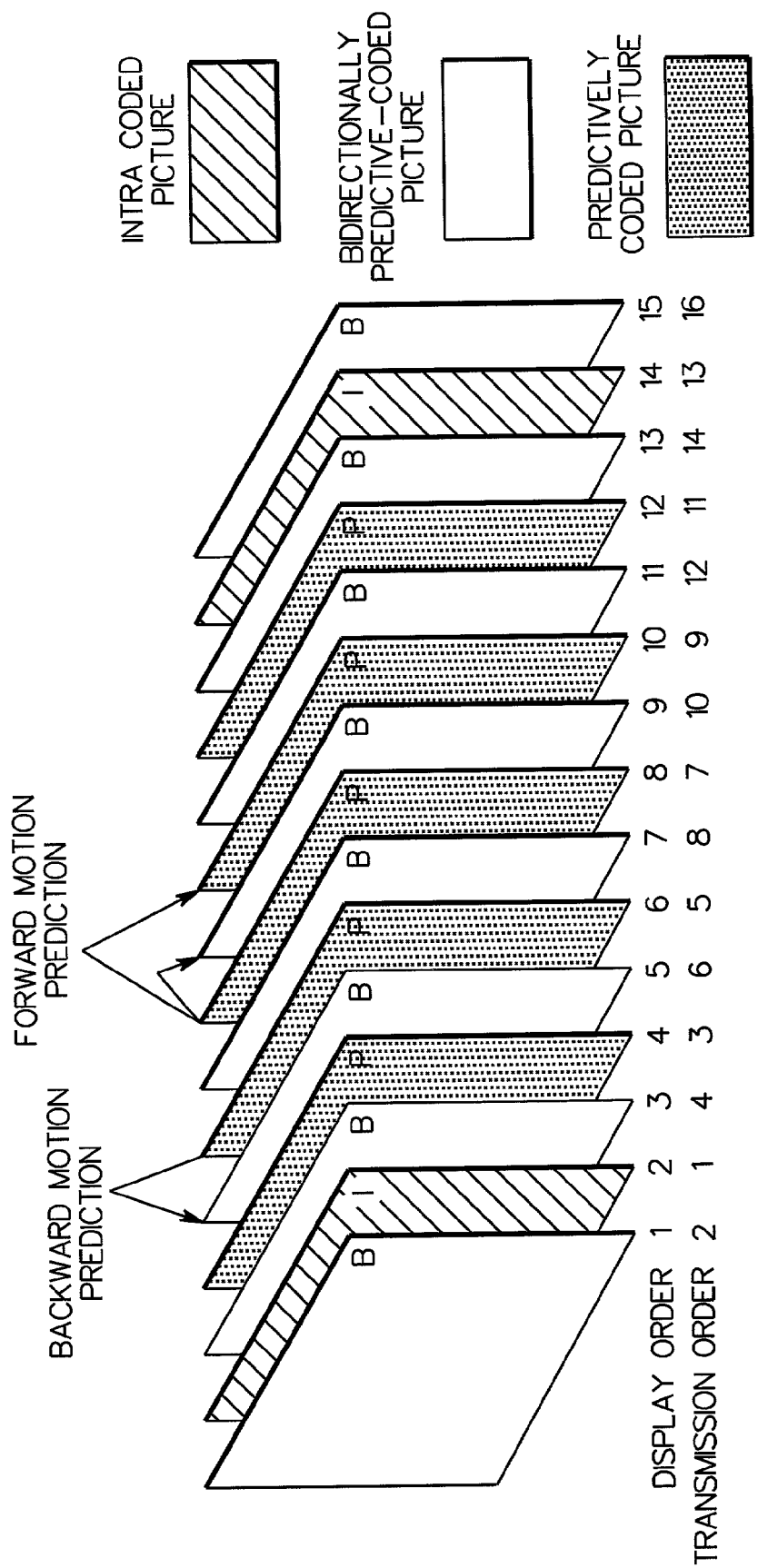
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
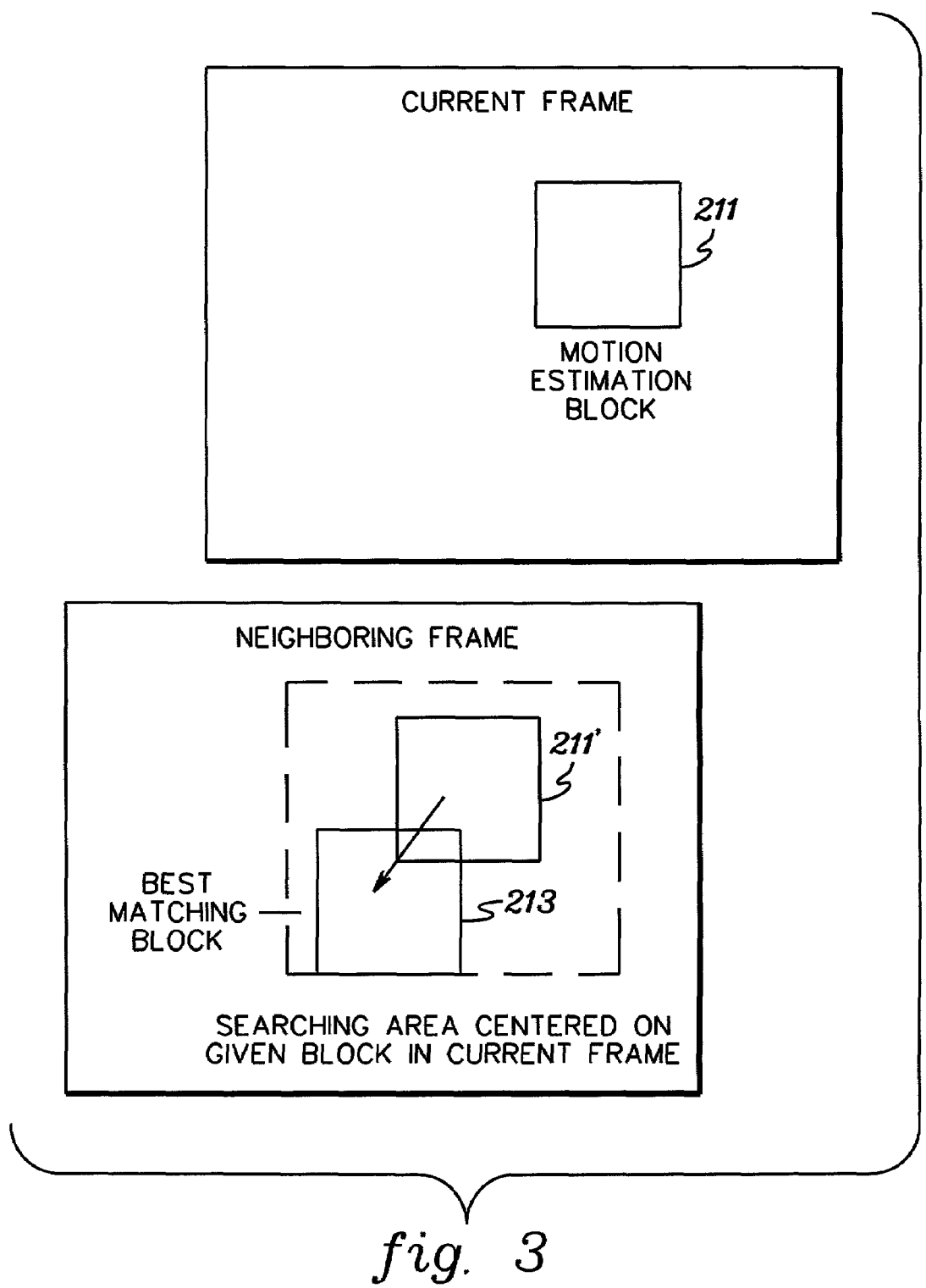
FIG. 3 illustrates the search from the motion estimation block in the current frame or picture to the best matching block in a subsequent or previous frame or picture. Elements 211 and 211' represent the same location in both pictures.
Figure 4:
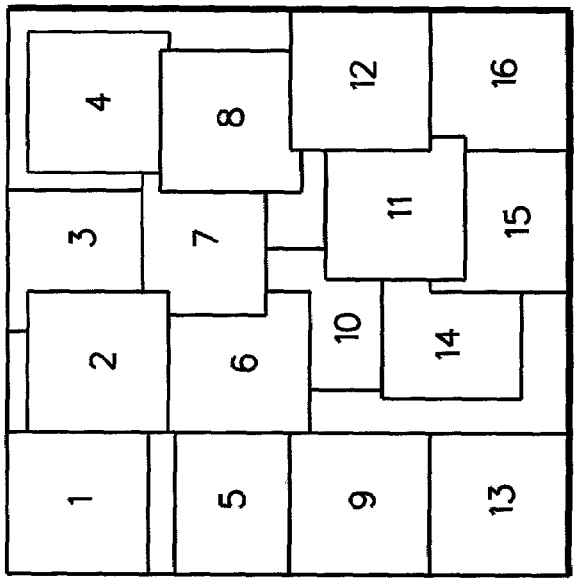
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, processing searches for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

As noted, when two pictures or frames have similar content, significant savings in the amount of data required to code the frames is realized by coding the differences between the pictures, rather than their entire content. When pictures are digitized their contents are described by numeric values which represent brightness and color. Each picture element or pixel is qualified as a number or a set of numbers. For most applications, these numbers represent the RGB values of the pixel, or more commonly, the luminance (Y) and chrominance (Cr,Cb). FIGS. 5a & 5b represent positioning of luminance and chrominance samples for 4:2:2 and 4:2:0 picture data, respectively.

The operational functions of an MPEG-2 encoder are discussed in further detail in U.S. Pat. No. 6,118,823 by Carr et al., entitled "Control Scheme For Shared-Use Dual-Port Predicted Error Array," which is hereby incorporated herein by reference in its entirety.

The MPEG Standard narrowly defines a "skip" macroblock as a macroblock within a P picture which has a zero prediction error and a zero motion vector when the macroblock is compared against its reference macroblock. In a B picture, a skip macroblock has a zero prediction error and a motion vector that is the same as the motion vector for the previous macroblock, which could not be an intracoded macroblock. Once identified, no bits are used to code a skip macroblock.

As noted above, when encoding MPEG-2 digital video streams at low bit rate, too many bits might be used in encoding a picture. When this occurs, the picture can become blocky and picture quality suffers. In order to assist in preventing this from happening, a technique is disclosed herein which allows a user the flexibility of defining what qualifies as a skip macroblock. Once identified, no bits are used to encode the skip macroblock. Advantageously, this technique can be used to reduce the total number of bits needed to encode a picture since fewer macroblocks would need to be coded, or alternatively, bits could be saved from the encoding of one or more skip macroblocks for use in other portions of the picture.

The technique presented herein encourages skip macroblocks based on, in one embodiment, comparisons with user defined thresholds for maximum ($LUM_{max\ diff}$, $CHR_{max\ diff}$) and prediction error sums ($LUM_{sum}$, $CHR_{sum}$). In accordance with this technique, a user can fine tune the criteria for skipping macroblocks, and thereby better control the number of bits needed to encode a picture.

In one embodiment, calculations are performed by the motion estimation hardware component to obtain a maximum prediction error for each macroblock, as well as an absolute summation. Since both luminance and chrominance components are considered for the maximum prediction error and the absolute summation, four values are calculated for each macroblock for use in checking a skip macroblock condition. These calculations can include:

$$LUM_{sum} = \sum_{i=1}^{256} |LUM_{cur} - LUM_{ref}|$$

$$CHR_{sum} = \sum_{i=1}^{n} |CHR_{cur} - CHR_{ref}|$$

n=128 for 4:2:0
n=256 for 4:2:2

$LUM_{max\ diff} = \max_i |LUM_{cur} - LUM_{ref}|$ i=1 to 256

$CHR_{max\ diff} = \max_i |CHR_{cur} - CHR_{ref}|$ i=1 to n n=128 for 4:2:0
n=256 for 4:2:2 where:
$LUM_{cur}$=luminance value of pixel i of current macroblock.
$LUM_{ref}$=luminance value of corresponding pixel i in reference macroblock.
$CHR_{cur}$=chrominance value of pixel i of current macroblock.
$CHR_{ref}$=chrominance value of corresponding pixel i in reference macroblock.

Unless otherwise indicated, the variable i proceeds between 1 and 256, which assumes that the current macroblock comprises a 16 by 16 array of pixels.

In addition to the above calculations, the motion vector magnitude (MV) is also employed in determining whether to switch a coding decision for a current macroblock from non-intra (i.e., P or B coding) to skip. As one specific example, the switching might occur if the following five equations are met:

$LUM_{sum} < TH1$ $CHR_{sum} < TH2$ $LUM_{max\ diff} < TH3$ $CHR_{max\ diff} < TH4$, and For P picture, $|MV| < TH5$ For B picture, $|MV - MV_{prev}| < TH5$ Where TH1, TH2, TH3 & TH4 can be experimentally determined by one skilled in the art, or could be user programmable to allow for customization of the encoding process. By being user programmable, a user will have the flexibility to choose a wide range of thresholds and pick those values that provide the best result for a given video source. Threshold TH5 may be predefined as explained further below.

Figure 6A:
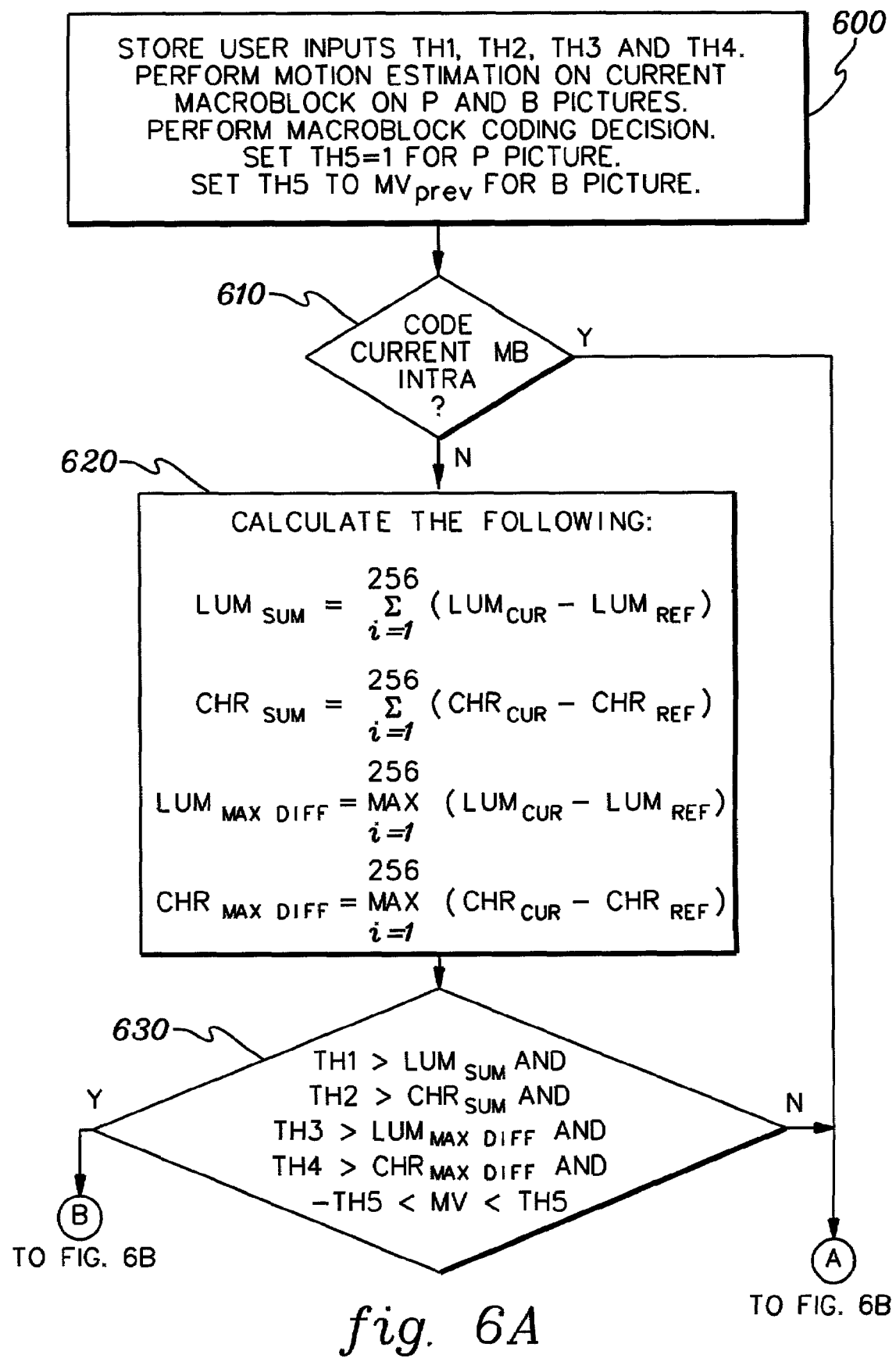
FIGS. 6A & 6B illustrate one embodiment of a process for coding macroblocks in accordance with an aspect of the present invention. This process includes initially determining that a current macroblock is to be non-intra coded and then switching the encoding decision for the at least one macroblock from non-intra to skip when the prediction error components and the motion vector are below certain thresholds.
Figure 6B:
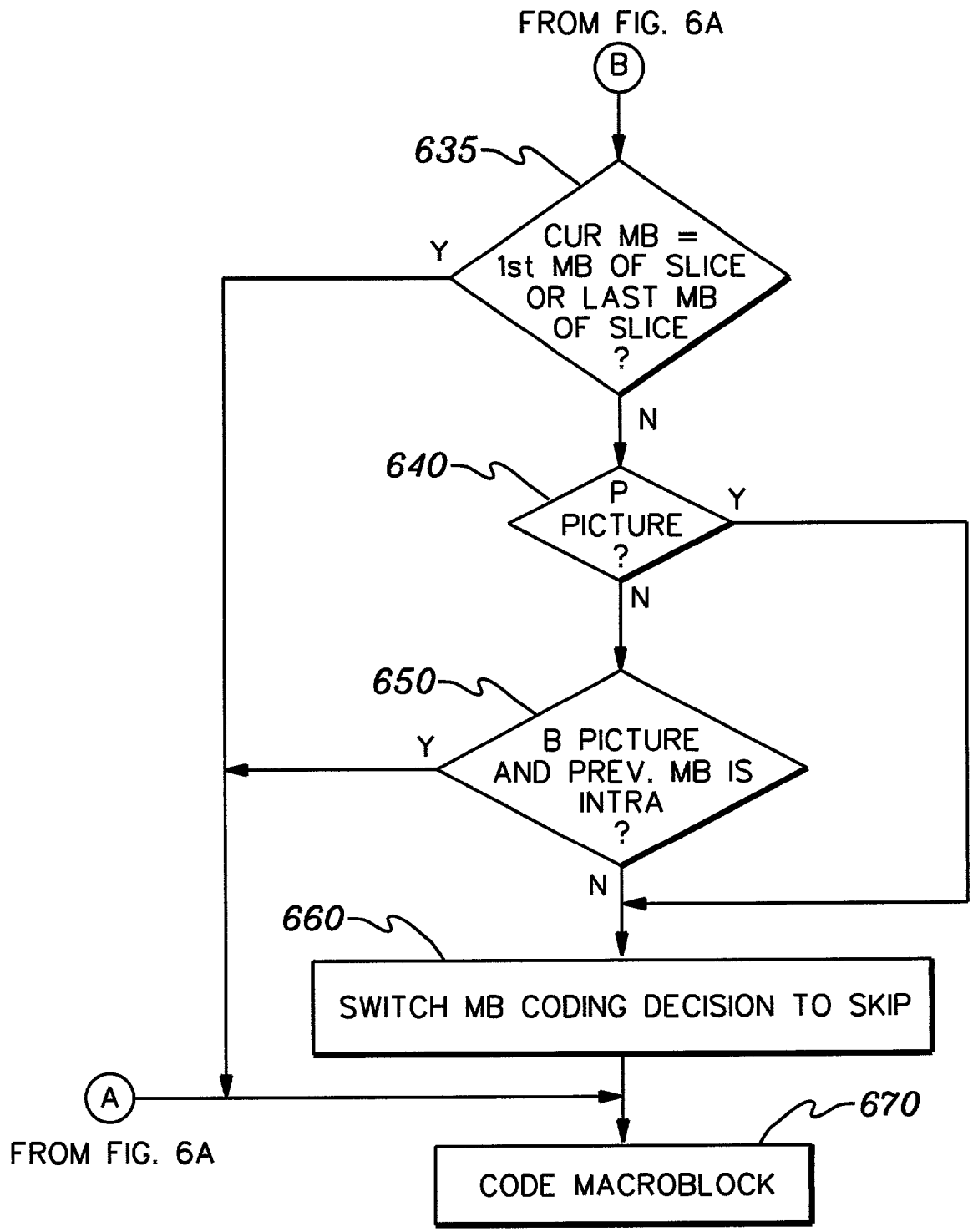

FIGS. 6A & 6B depict in greater detail one process example of this technique. In this example, a user initially stores threshold inputs TH1, TH2, TH3 and TH4 600. Conventional motion estimation is performed on a current macroblock of a P or B picture. A macroblock coding decision is made. Additionally, threshold TH5 is preset to greater than zero but ≦0.5, 0.75, or 1 (for example). Processing then determines whether the current macroblock is intra or non-intra coded 610. If intra coded, then the macroblock is simply coded 670 (see FIG. 6B).

Assuming that the decision is to code the current macroblock as non-intra, then processing calculates the absolute summation components $LUM_{sum}$ and $CHR_{sum}$ and maximum difference components $LUM_{max\ diff}$ and $CHR_{max\ diff}$ for the pixels of the current macroblock as outlined above 620. Note that it is again assumed in this example that the current macroblock comprises a conventional 16×16 array of pixels, which results in 256 pixels to be considered in determining the absolute summation components and maximum difference components.

Processing next determines whether the absolute luminance summation component ($LUM_{sum}$) is less than a first threshold (TH1), the absolute chrominance summation component ($CHR_{sum}$) is less than a second threshold (TH2), the maximum luminance difference value ($LUM_{max\ diff}$) is less than a third threshold (TH3), the maximum chrominance difference value ($CHR_{max\ diff}$) is less than a fourth threshold (TH4) and the motion vector is within +/- a fifth threshold (TH5) 630.

As an example, thresholds TH1 through TH4 could be preprogrammed based on experimentation, or could be user programmable to provide the user with greater flexibility during the encoding process. Although the use of the five comparisons in combination is believed advantageous, those skilled in the art will recognize that one or more of the comparisons might be omitted without departing from the scope of the present invention as defined by the appended claims. Also, as one specific example, TH1 might comprise 512, and TH2 512 for 4:2:2 format, and 256 for 4:2:0 format. TH3 and TH4 might each be 16, while TH5 might be 1. Other threshold values might also be used without departing from the scope of the present invention.

Continuing with the processing of FIGS. 6A & 6B, if one or more of the comparisons is untrue, then the current macroblock is coded non-intra in accordance with the prior coding decision. Assuming that all the comparisons are true, then processing determines whether the current macroblock is either a first macroblock or last macroblock of a slice 635. If either of these conditions is met, then the non-intra coding decision for the macroblock is maintained and the macroblock is coded 670.

Assuming that the current macroblock is other than the first or last macroblock of a slice, processing determines whether the current macroblock is to be coded as a P macroblock 640. If so, then the macroblock decision is switched to a skip macroblock 660, after which the macroblock undergoes coding 670, which in this case means the macroblock coding is simply skipped.

If the original decision to code the macroblock was a bi-directional coding decision, then processing determines whether the previous macroblock was intracoded 650. If so, then the non-intra coding decision for the macroblock is maintained and the macroblock is coded 670. Otherwise, the coding decision is switched to a skip macroblock 660, and no bits are used.

Those skilled in the art will note from the above discussion that the present invention provides encoding flexibility by allowing a user to designate certain macroblocks with, for example, a relatively low absolute predictive error and a low magnitude motion vector, as skip macroblocks during the encoding process.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of encoding macroblocks of at least one frame of a sequence of video frames, the method comprising:
    encoding macroblocks of a frame of a sequence of video frames, said encoding comprising for at least one macroblock of the frame:
        (i) deciding to code the at least one macroblock as a non-intra macroblock;
        (ii) switching the coding decision for the at least one macroblock from non-intra to skip when an absolute prediction error for the at least one macroblock is less than a prediction error threshold and a magnitude of a motion vector for the at least one macroblock is less than a defined motion vector threshold, the defined motion vector threshold being greater than zero; and
        (iii) wherein the absolute prediction error for the at least one macroblock comprises an absolute sum component and a maximum difference component for both luminance data and chrominance data of the at least one macroblock, and wherein the prediction error threshold comprises multiple thresholds, a first threshold (TH1) comprising a threshold for an absolute luminance summation component ($LUM_{sum}$) a second threshold (TH2) comprising a threshold for an absolute chrominance summation component ($CHR_{sum}$), a third threshold (TH3) comprising a threshold for a maximum luminance difference value ($LUMM_{max\ diff}$), and a forth threshold (TH4) comprising a threshold for a maximum chrominance difference value ($CHR_{max\ diff}$), of the at least one macroblock compared with a reference macroblock.

2. The method of claim 1, wherein the prediction error threshold comprises at least one programable prediction error threshold.

3. The method of claim 1, wherein the absolute prediction error threshold components for the at least one macroblock are less than the multiple thresholds when:

$LUM_{sum}$<TH1

$CHR_{sum}$<TH2

$LUM_{max\ diff}$<TH3

$CHR_{max\ diff}$<TH4 and wherein the magnitude of the motion vector for the at least one macroblock is less than the motion vector threshold when:

For P picture, $|MV|$<TH5

For B picture, $|MV-MV_{prev}|$<TH5 wherein:
    MV=the motion vector for the at least one macroblock.
    $MV_{prev}$=the motion vector of the previous macroblock.
    TH5=motion vector threshold.

4. The method of claim 3, wherein TH1, TH2, TH3, TH4 are programmable and wherein TH5 is a preset value.

5. The method of claim 4, wherein
    TH1=512,
    TH2=512 if 4:2:2 format, or 256 if 4:2:0 format,
    TH3=16, and
    TH4=16.

6. The method of claim 1, wherein the switching (ii) further comprises only switching the coding from non-intra coding to skip coding if the at least one macroblock is other than a first or a last macroblock of a slice, or the at least one macroblock is a B macroblock and the previous macroblock in the slice was non-intra coded.

7. A system for encoding macroblocks of at least one frame of a sequence of video frames, the system comprising:
    means for encoding macroblocks of a frame of a sequence of video frames, said means for encoding comprising for at least one macroblock of the frame, means for:
        (i) deciding to code the at least one macroblock as a non-intra macroblock;
        (ii) switching the coding decision for the at least one macroblock from non-intra to skip when an absolute prediction error for the at least one macroblock is less than a prediction error threshold and a magnitude of a motion vector for the at least one macroblock is less than a defined motion vector threshold, the defined motion vector threshold being greater than zero; and
        (iii) wherein the absolute prediction error for the at least one macroblock comprises an absolute sum component and a maximum difference component for both luminance data and chrominance data of the at least one macroblock, and wherein the prediction error threshold comprises multiple thresholds, a first threshold (TH1) comprising a threshold for an absolute luminance summation component ($LUM_{sum}$) a second threshold (TH2) comprising a threshold for an absolute chrominance summation component ($CHR_{sum}$), a third threshold (TH3) comprising a threshold for a maximum luminance difference value ($LUM_{max\ diff}$), and a forth threshold (TH4) comprising a threshold for a maximum chrominance difference value ($CHR_{max\ diff}$), of the at least one macroblock compared with a reference macroblock.

8. The system of claim 7 wherein the prediction error threshold comprises at least one programable prediction error threshold.

9. The system of claim 7, wherein the absolute prediction error threshold components for the at least one macroblock are less than the multiple thresholds when:

$LUM_{sum} < TH1$ $CHR_{sum} < TH2$ $LUM_{max\ diff} < TH3$ $CHR_{maxd\ diff} < TH4$ and wherein the magnitude of the motion vector for the at least one macroblock is less than the motion vector threshold when:

For P picture, $|MV| < TH5$

For B picture, $|MV - MV_{prev}| < TH5$ wherein:
MV=the motion vector for the at least one macroblock.
$MV_{prev}$=the motion vector of the previous macroblock.
TH5=motion vector threshold.

10. The system of claim 9, wherein TH1, TH2, TH3, TH4 are programmable and wherein TH5 is a preset value.

11. The system of claim 10, wherein
TH1=512,
TH2=512 if 4:2:2 format, or 256 if 4:2:0 format,
TH3=16, and
TH4=16.

12. The system of claim 7, wherein the switching (ii) further comprises only switching the coding from non-intra coding to skip coding if the at least one macroblock is other than a first or a last macroblock of a slice, or the at least one macroblock is a B macroblock and the previous macroblock in the slice was non-intra coded.

13. At least one program storage device readable by a machine, tangibly embodying at least one program of instructions executable by the machine to perform a method of encoding macroblocks of at least one frame of a sequence of video frames, the method comprising:
encoding macroblocks of a frame of a sequence of video frames, said encoding comprising for at least one macroblock of the frame:
(i) deciding to code the at least one macroblock as a non-intra macroblock;
(ii) switching the coding decision for the at least one macroblock from non-intra to skip when an absolute prediction error for the at least one macroblock is less than a prediction error threshold and a magnitude of a motion vector for the at least one macroblock is less than a defined motion vector threshold, the defined motion vector threshold being greater than zero; and (iii) wherein the absolute prediction error for the at least one macroblock comprises an absolute sum component and a maximum difference component for both luminance data and chrominance data of the at least one macroblock, and wherein the prediction error threshold comprises multiple thresholds, a first threshold (TH1) comprising a threshold for an absolute luminance summation component ($LUM_{sum}$) a second threshold (TH2) comprising a threshold for an absolute chrominance summation component ($CHR_{sum}$), a third threshold (TH3) comprising a threshold for a maximum luminance difference value ($LUM_{max\ diff}$), and a forth threshold (TH4) comprising a threshold for a maximum chrominance difference value ($CHR_{max\ diff}$), of the least one macroblock compared with a reference macroblock.

14. The at least one program storage device of claim 13, wherein the prediction error threshold comprises at least one programable prediction error threshold.

15. The at least one program storage device of claim 13, wherein the absolute prediction error threshold components for the at least one macroblock are less than the multiple thresholds when:

$LUM_{sum} < TH1$ $CHR_{sum} < TH2$ $LUM_{max\ diff} < TH3$ $CHR_{max\ diff} < TH4$ and wherein the magnitude of the motion vector for the at least one macroblock is less than the motion vector threshold when:

For P picture, $|MV| < TH5$

For B picture, $|MV - MV_{prev}| < TH5$ wherein:
MV=the motion vector for the at least one macroblock.
$MV_{prev}$=the motion vector of the previous macroblock.
TH5=motion vector threshold.

16. The at least one program storage device of claim 15, wherein TH1, TH2, TH3, TH4 are programmable and wherein TH5 is a preset value.

17. The at least one program storage device of claim 13, wherein the switching (ii) further comprises only switching the coding from non-intra coding to skip coding if the at least one macroblock is other than a first or a last macroblock of a slice, or the at least one macroblock is a B macroblock and the previous macroblock in the slice was non-intra coded.

* * * * *